Figure 1:
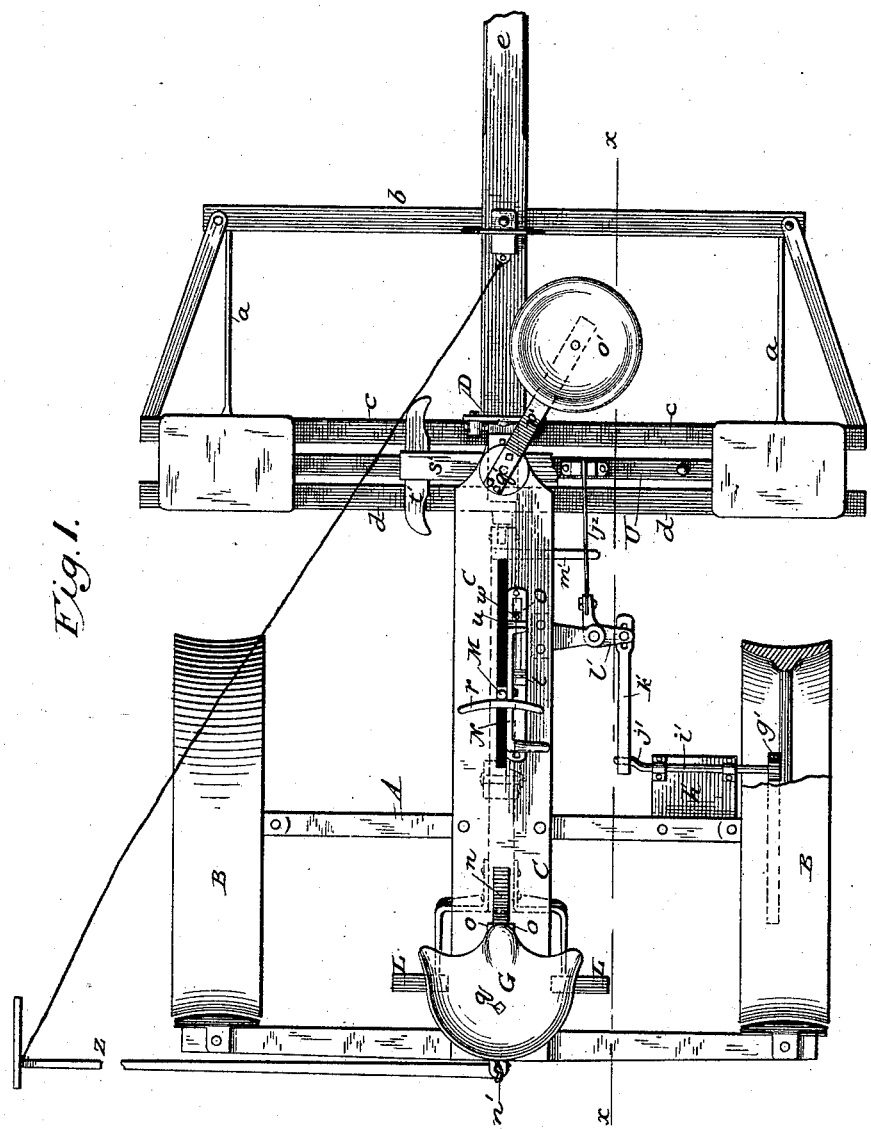

(No Model.) 4 Sheets—Sheet 1.

J. CASE.
CORN PLANTING MACHINE.

No. 316,743. Patented Apr. 28, 1885.

Attest
Sidney P. Hollingsworth
W. H. Shipley

Inventor
Jarvis Case
By his Attorney
Philip T. Dodge.

(No Model.) 4 Sheets—Sheet 2.
J. CASE.
CORN PLANTING MACHINE.
No. 316,743. Patented Apr. 28, 1885.
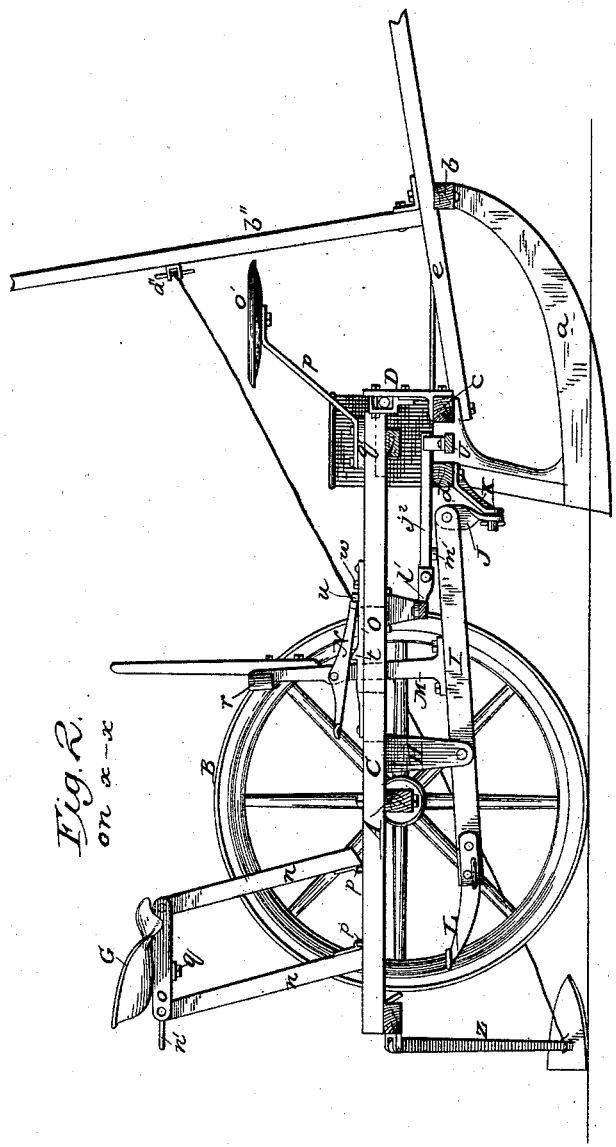
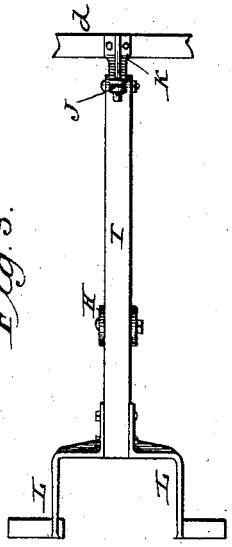
Attest
Inventor.
Jarvis Case.
By his Attorney.
P. T. Dodge.

(No Model.) 4 Sheets—Sheet 3.
J. CASE.
CORN PLANTING MACHINE.
No. 316,743. Patented Apr. 28, 1885.
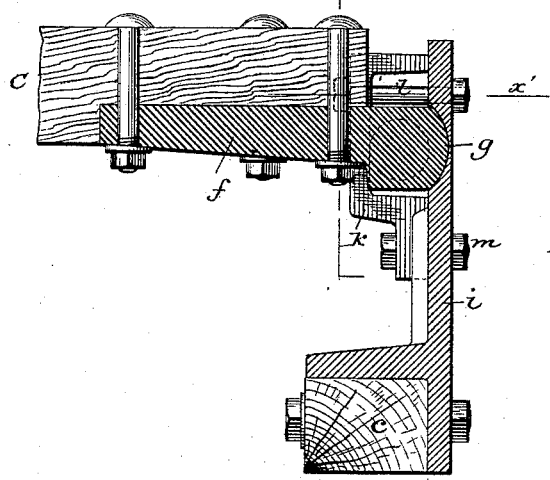
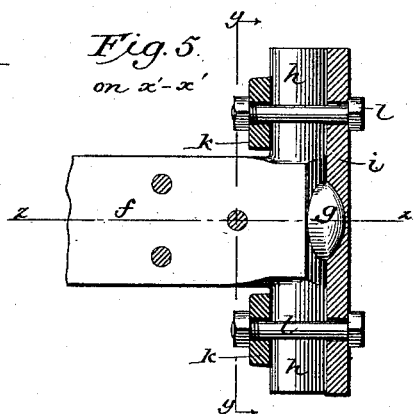
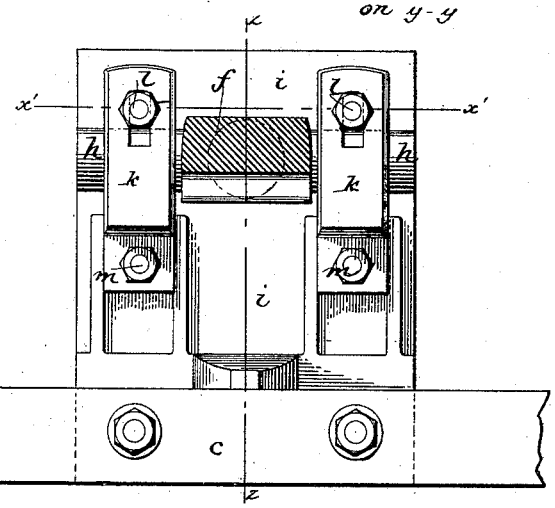
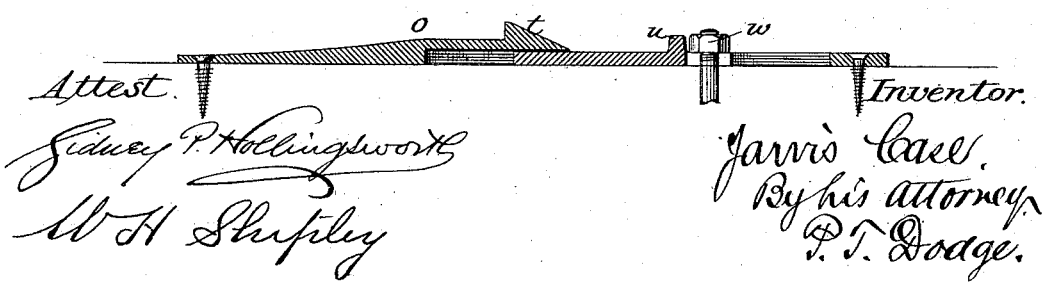
Attest
Sidney P. Hollingsworth
W. H. Shipley
Inventor.
Jarvis Case,
By his attorney
P. T. Dodge.

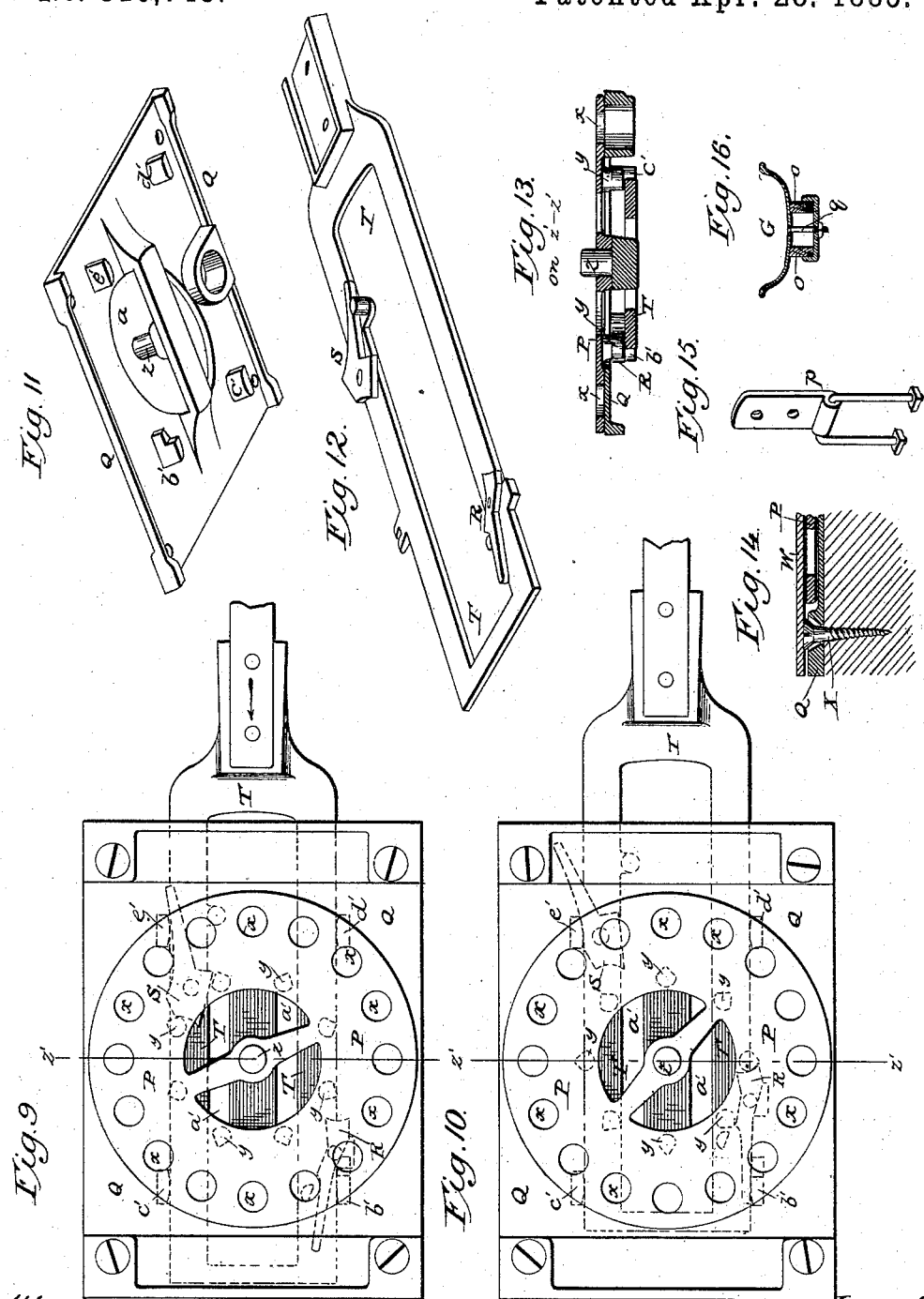

UNITED STATES PATENT OFFICE.

JARVIS CASE, OF TROY, OHIO.

CORN-PLANTING MACHINE.

SPECIFICATION forming part of Letters Patent No. 316,743, dated April 28, 1885.

Application filed March 19, 1884. (No model.)

*To all whom it may concern:*

Be it known that I, JARVIS CASE, of Troy, in the county of Miami and State of Ohio, have invented certain Improvements in Corn-Planting Machines, of which the following is a specification.

This invention has reference to that class of two-row horse planters in which a rear-wheeled frame is jointed at its front to a draft-frame provided with runners to open the furrows, and with dropping mechanism by means of which the seed is delivered through the heels of the runners into the furrows.

The invention has reference to the manner of constructing and uniting the two frames, and to appliances whereby the driver riding upon the rear frame is enabled to adjust and control the runner-frame in a convenient and positive manner; to means whereby the dropping mechanism may be operated automatically from the traction-wheels when the machine is to be used as a drill; to improvements in the construction of the rotary dropping mechanism; to a dropper's seat mounted on an arm movable horizontally in various directions, and to various other details, which will be hereinafter more fully described and claimed.

Referring to the accompanying drawings, Figure 1 represents a top plan view of my improved machine. Fig. 2 represents a longitudinal section of the machine on the line $x\,x$ of Fig. 1. Fig. 3 is a top plan view of the lever and connecting mechanism by which the position of the runner-frame is controlled. Fig. 4 is a vertical longitudinal section on the line $x\,x$ of Fig. 1, illustrating the joint by which the runner and wheel-frames are connected. Fig. 5 is a horizontal section on the line $x'\,x'$ of Figs. 4 and 6. Fig. 6 is a vertical section on the line $y\,y$ of Fig. 4, looking in the direction indicated by the arrow. Figs. 7 and 8 are respectively a top plan view and a longitudinal vertical section of the devices employed for locking the lever by which the position of the runner-frame is controlled. Fig. 9 is a top plan view of one of the rotary dropper-plates and the mechanism for rotating and checking the same, the operating-pawls being moved to the left. Fig. 10 is a similar view of said parts with the operating-pawls moved to the right. Fig. 11 is a perspective view, looking against the under side of the stationary bed-plate. Fig. 12 is a perspective view of the reciprocating frame and pawls by which motion is imparted to the rotary plate. Fig. 13 is a cross-section through the dropping mechanism on the line $z'\,z'$, Figs. 9 and 10. Fig. 14 is a cross-section of the same, illustrating the adjustable supports employed in connection with the top or covering plate to admit of feed-plates of different thicknesses being employed at will. Fig. 15 is a perspective view of the lower hinge of one of the seat-standards. Fig. 16 is a vertical cross-section through the driver's seat and its supporting-bars.

Referring to the drawings, A represents a horizontal axle mounted at its ends in the two ground-wheels B, which are constructed with wide concave surfaces, as usual.

C represents a longitudinal bar or beam bolted firmly to the middle of the axle, and constituting in connection with the wheels and axle the rear or wheel frame. The central bar or beam, C, is extended forward beyond the wheels, and united at its forward end by means of a joint, D, to the front or runner frame. This runner-frame consists of two vertical runners or furrow-openers, $a$, united at their forward ends by means of a cross-bar, $b$, and at their rear ends by means of two cross-bars, $c$ and $d$, to which they are firmly bolted. The runner-frame is provided with a central tongue or draft-pole, $e$.

The joint D, by which the two frames are united, is constructed in the peculiar manner which will be presently described, for the purpose of permitting the runner-frame to tip in a forward and backward direction, and the two frames to tip in a lateral direction independently of each other—this in order that the frames may follow the inequalities in the surface of the ground, and that the runners may be adjusted in different positions as the condition or character of the soil may render necessary.

Referring to the details of the joint, attention is directed particularly to Figs. 4, 5, and 6. The wheel-frame has the forward end of its longitudinal bar C provided with a plate,

*f*, bolted firmly thereto. This plate terminates at the forward end in a spheroidal portion, *g*, and in two horizontal arms or trunnions, *h*, extending on opposite sides of the part *g*. The spheroidal portion is seated in a corresponding cavity formed in the rear face of the upright plate *i*, which is bolted at its lower edge firmly to one of the cross-bars of the runner-frame. The arms or journals *h* bear against the rear face of the plate *i*, and are confined against the same by means of stirrups *k*, secured to the rear face of the main plate by means of bolts *l* and *m*. It will be seen that the trunnions *h* are thus confined between the vertical faces of the plate *i* and stirrups *k*, whereby the runner-frame is prevented from turning or swiveling in a horizontal direction with respect to the rear frame. The space between the plates *i* and *k*, into which the trunnions project, is enlarged or elongated in a vertical direction, so that the trunnions *h* of the wheel-frame may play vertically therein, rocking about the portion *g* as a center.

Under the above construction it will be seen that the runner-frame is permitted to tip in a forward and backward direction by the parts playing around the trunnions *h*, and that the two frames are permitted to rock or tip sidewise with respect to each other in consequence of the vertical motion of the trunnions *h* between the plates *i* and *k*; in short, the joint permits the two frames to play freely with respect to each other except in a horizontal direction. The arms or plates *k* are slotted to receive the fastening-bolts *l*, and the plate *i* slotted vertically to receive the fastening-bolts *m*. This construction permits the plates *k* to be lowered in such manner as to limit the side motion of the two frames or entirely prevent the same.

For the purpose of enabling the rider to force the runners downward with a proper degree of pressure, as well as to lift or assist in lifting them from the ground when required, I mount on the bar C of the wheel-frame a driver's seat, G, which is adjustable in a forward and backward direction, so that the weight of the rider may be thrown to the rear end of the frame in order to overcome the weight of the runners, or thrown forward to a point substantially over or in advance of the axle when the runners are to be forced downward. It will of course be understood that this elevation and depression of the runners is effected by the bar C of the wheel-frame acting through the joint D upon the runners.

The seat is sustained by means of two standards, *n*, hinged at their lower ends to the bar C, and jointed at their upper ends between two horizontal bars, *o*, on which the seat is mounted. The standards *n* are connected to the bar C by means of hinges *p*, of the form plainly represented in Fig. 15, and are beveled at their lower ends in the manner shown in Fig. 2. On swinging the seat to the rear the standards will be tipped backward and sustained in position by means of the lower end of the rear standard bearing on top of the bar C, as shown. When, on the contrary, the seat is moved forward, the standards will have a forward inclination, and will be sustained by the lower end of the forward standard bearing upon the bar C. Thus it will be seen that the lower beveled ends of the standards serve as stops to limit the forward and backward motion of the seat.

In order that the position of the seat may be adjusted for riders of different weights and of different lengths of limb, provision is made for an additional adjustment in a forward and backward direction. The seat is mounted to slide upon the bars *o*, before referred to, and is confined in position by means of a bolt, *q*, passing from the seat downward between the bars and through a plate or washer thereunder in the manner plainly represented in Figs. 2 and 16.

I will now describe the means employed for raising and lowering the runners. To the bar C, I secure, on the under side, a bracket or pendant, H, to which I pivot, midway of its length, a horizontal lever, I, extending in a fore-and-aft direction. The forward end of this lever is connected by a transverse pivot to a link, J, the lower end of which is attached to a horizontal journal on an arm or plate, K, bolted to the rear end of the runner-frame. This connection permits the runner-frame to rock in all directions when the parts are free. By moving the lever I in one direction or the other it is caused, through the intermediate joint, to effect the elevation or depression of the heel ends of the runners. The rear end of the lever is provided with laterally-extending arms L, formed thereon or attached firmly thereto, and extended backward in such position that they may be readily depressed by the feet of the rider while occupying the seat.

As a means of operating the lever by hand, I bolt firmly thereto in advance of its fulcrum an upright lever or arm, M, which extends upward through a slot in the bar C in such position that its upper end may be conveniently operated by the attendant. At a suitable point on this lever I form a plate or foot-rest, *r*. The attendant, placing his foot against this plate, may exert a downward pressure upon the lever and runners. This pressure may be continued while the machine is in action without fatigue, and thus the depth to which the runners enter the soil kept at all times under the control of the attendant. A backward motion of the arm M has the effect of lifting the runners.

For the purpose of limiting the descent of the runners, as well as of locking the same in an elevated position when raised above the ground, I pivot to the upright arm M a pawl, N, the forward end of which is arranged to engage with shoulders on a stop-plate, O. The plate is provided, as shown in Figs. 2, 7, and 8, with two shoulders, *t* and *u*. When the arm is drawn backward to lift the runners, the dog engages behind the shoulder $t$, and maintains them in the elevated position. When, however, the runners are depressed to an operative position, the shoulder $u$ serves to arrest the advance of the pawl, and thus limit the descent of the runners.

In order to vary the depth to which the runners are permitted to enter the ground, the forward shoulder, $u$, is formed upon a supplemental plate adapted to slide forward and backward, and secured in position by means of a screw, $w$, as plainly represented in Figs. 7 and 8. The pawl or dog N is extended rearward beyond the arm or handle M, in order that it may be disengaged by a pressure of the foot on its rear end.

Passing now to the mechanism by which the seed is deposited, it will be found to consist, essentially, of a rotary dropper-plate provided with a series of cells or pockets extending vertically through the same, these pockets being first presented in position to receive the corn from the hopper, and subsequently carried by the rotation over an opening or tube, through which the corn is discharged in a downward direction, as usual in machines of this type. My improvements in this regard relate to the peculiar construction of the plate and of the means for imparting motion thereto.

P represents the rotary dropper-plate, made of circular form and provided with a series of seed-cells, $x$, and also provided on the under side with a series of depending studs, $y$. There are half as many studs as cells, and they are disposed in a circular series about the center of the plate. The plate overlies a stationary bottom plate, Q, and revolves on a central journal, $z$, formed on a bar which spans the central opening, $a'$, in the plate, as shown in Fig. 11. The opening $a'$ admits of the studs on the under side of the rotary plate extending downward through the stationary plate in position to be acted upon by reciprocating dogs or pawls. There are two of these pawls, R and S, mounted on the frame T, which is arranged to reciprocate below the stationary plate, in the manner represented in Figs. 9, 10, and 13. The pawls are connected by vertical pivots or trunnions to the reciprocating plate, so that they may swing in a horizontal direction to a limited extent. Each pawl is projected in advance of its pivot, and also extended backward a considerable distance in rear of the same, the rear end being of reduced width. On the under side of the stationary plate there are four depending studs, $b'$, $c'$, $d'$, and $e'$, all of which serve as guides for the edges of the reciprocating frame-wheel.

$e'$ and $b'$ serve the additional purpose of acting against the outer edges of the pawls in order to swing them about their pivots for a purpose which I will now explain. Each pawl is curved on the outer side, or the side which passes next to the stationary studs. The result of this arrangement is that as each pawl is carried in one direction with the plate it acts against the corresponding stud and is turned thereby. The arrangement is such that as each pawl moves forward to act upon the disk its rear end is swung inward toward the center, and that as it moves backward with the frame it swings in the opposite direction about its pivot.

The operation in detail is as follows: On moving the reciprocating frame to the left, as indicated by the arrow in Fig. 9, the pawl S acts at its forward end against one of the studs on the under side of the dropper-plate, carrying the same before it, and thereby imparting a rotary motion to the plate. As the frame completes its forward movement, the stationary stud $e'$, acting on the rear end of the pawl S, causes the latter to swing inward in such position that its inner edge will be brought in the path of the next stud on the plate, so as to arrest the same, and thereby prevent the further rotation of the plate. It will be observed that when the rotation of the plate is thus arrested one of its studs bears against the pawl in advance of the plate, while the other bears against the same in rear of the plate. This arrangement is found in practice to give a smoother and easier action of the parts than could otherwise be secured. While this action is taking place on the part of the pawl S, the pawl R has in the meantime swung outward at its active end to permit the studs in the plate to pass by it; but at the finish of the stroke the forward end of the said pawl R, acted upon by the stud $b'$, was forced inward behind one of the studs on the plate, in position to act thereon when the motion of the parts is reversed. At the end of the stroke the parts will be in the position represented in Fig. 9. If, now, the motion of the frame and pawls be reversed and the parts carried to the right, the pawl R will act at its forward end against one of the studs and continue the rotary motion of the plate, the pawl S moving in the meanwhile idly backward. At the completion of this stroke the pawl R is turned upon its pivot by the stud $b'$, acting on its rear end, so that it is caused to encounter the next tooth upon the disk and serve as a stop.

From the foregoing it will be seen that the two dogs operate alternately to turn the disk, which is thus given an intermitting rotation. It will also be seen that each dog is caused to operate in a positive manner and to serve the twofold purpose of rotating the disk and of arresting its motion at the completion of each stroke, whereby the disk is prevented from being carried too far by reason of its momentum.

It will be noticed as a peculiarity of my construction that the pawls remain in contact with their controlling-studs until the completion of their movement, whereby they are held positively in proper position to engage the studs of the dropper-plate. This is an important feature, in that it prevents danger of the pawls being jarred out of position, so as to cease their action at improper times.

I have described above the seed mechanism of one side of the machine. A like mechanism will of course be employed at the opposite side in the usual manner, and the two operated by means of a connecting-bar, U, and a hand-lever connected therewith, this arrangement constituting no part of the invention.

In order to adapt the machine for all contingencies, it is desirable to provide for changing the quantity of seed delivered at each discharge. This end is secured by providing a series of disks of different thicknesses, interchangeable one for another.

In order to relieve the disks from the pressure of the superincumbent mass of grain in the hopper, and to prevent the grain from flowing down continuously through the disk, and thence through the discharge-opening, I place, as usual, above the rotary disk a cut-off plate or false bottom, W. It is necessary that this plate shall be supported so that the rotary disk may be relieved of its weight and friction. In order that the plate may be thus sustained and adjusted vertically to permit the introduction of the rotary disks of different thicknesses, I make use of supporting-screws X, located in the four corners of the hopper and passing downward through the stationary plate Q, as plainly represented in Fig. 14. The cut-off plate or false bottom W rests loosely upon these screws. By removing the plate and turning the screws upward or downward they may be adapted to sustain the plate at the required elevation.

It is sometimes desirable to have a feed mechanism automatic for drilling purposes. To this end I provide one of the ground-wheels with an internally-geared ring or wheel, $g'$, and mount on the frame a plate, $h'$, supporting a horizontal shaft, $i'$. One end of the shaft is provided with a pinion engaging in the gear on the main wheel, while the opposite end is provided with a crank, $j'$. From this crank I extend a pitman, $k'$, to an elbow-lever, $l'$, one arm of which is provided with an elastic extension, $j^2$, arranged to engage at its extremity in a notched plate on top of the feed-bar U. By this arrangement a reciprocating motion is imparted to the feed-bar.

The arm $j^2$ is made elastic in order that the parts may be relieved from strain and breakage avoided in the event of there being any obstruction to the movement of the parts. The arm $j^2$ is connected to the elbow-lever by means of a horizontal pivot, which admits of its being turned upward out of connection when desired. The notched plate on the feed-bar has its upper edges inclined downward toward the notch, whereby the operating-arm $j^2$ is caused to ride automatically into position when drawn downward. An arm, $m'$, is applied, as shown, for the purpose of automatically disengaging the arm $j^2$ from the feed mechanism when the runners are lifted from the ground, the feed mechanism being thus automatically prevented from operating when the machine is out of action.

For the purpose of marking the rows, I employ an ordinary marker arm or bar, Z, pivoted centrally to the frame in rear of the driver's seat in order that it may be thrown from side to side, as required, in a manner well understood by those skilled in the art. For the purpose of sustaining this arm in an upright position in moving the machine from place to place, a hooked arm or rest, $n'$, is attached to the lower end of the driver's seat or its supporting-bars, as shown in Figs. 1 and 2.

As shown in the drawings, the marker is hinged to the rear end of the machine, so that it may swing backward in the event of its encountering an obstruction. It is retained in position while in action by means of a cord extending from its outer end to a wooden pin, $a''$, seated in a metal plate or standard, $b''$, fixed rigidly in position at the front of the runner-frame. In the event of the runner encountering an obstruction of a character such as to subject the same to a dangerous strain, the wooden pin will break or yield, releasing the cord and thus permitting the runner to swing backward.

In operating the machine by hand a boy or other light attendant is ordinarily carried on the front, as in other machines of this class, to operate the feed mechanism.

For the purpose of carrying the dropper I provide at the front of the machine a seat, $o'$, sustained on one end of an arm, $p'$, which is united at its opposite end by a vertical pivot, $q'$, to the end of the bar C. This arrangement will permit the seat to be revolved about the pivot, or, in other words, adjusted in a horizontal direction, and thus its location may be varied in order to afford the dropper a change of position and avoid the fatigue ordinarily encountered when an unchangeable seat is used, and also to vary the pressure of the runners.

For the purpose of affording a rest for the feet of both the driver and dropper I bolt transversely to the forward end of the bar C a bar, $s'$, the ends of which are notched or otherwise fashioned to receive the feet of the driver. Across one or both ends of this bar I secure depending arms $t'$ to receive the feet of the dropper. By this arrangement I secure the equal pressure on the two runners, as the entire weight of the driver is applied at the center of the machine.

I am aware that horizontally-vibrating pawls operated by fixed studs have been used in connection with rotary dropper-plates, my invention in this regard consisting in the peculiarities of construction herein described.

I am also aware that foot-levers and hand-levers have been combined with locking devices in various forms and under various arrangements to effect the elevation and depression of the runner-frame, my invention consisting in the particular construction and arrangement represented in the drawings, whereby I am enabled to produce a machine cheaper and more simple than those in common use.

I am also aware that a marker reversible from side to side has been employed in connection with a corn-planter; but I believe myself to be the first to employ in connection with the marker the cord and break-pin, so that the runner may yield without breaking the cord.

Having thus described my invention, what I claim is—

1. In combination with the wheeled frame and the runner-frame jointed to the forward end thereof, the foot-lever I, pivoted to the under side of the wheeled frame and jointed to the runner-frame as a means of raising the latter, the lever M, the upright arm secured rigidly to said foot-lever as a means of depressing the runners, and the pawl N, for locking the upright end and thereby fixing the elevation of the runners.

2. The wheeled frame and the runner-frame jointed thereto, in combination with the lever I, pivoted to the wheeled frame and jointed at its forward end to the runner-frame, the upright arm M, attached rigidly to the lever, the gravitating dog N, pivoted to said lever and extended in rear thereof, and a stop, $u$, on the main frame, whereby the runners are automatically locked when lifted and their release permitted by the pressure of the foot of the operator.

3. The wheeled frame and the runner-frame jointed thereto, in combination with the lever I, pivoted to the wheeled frame and jointed to the runner-frame, and the standard M, secured rigidly to said lever and extending above the main frame, said standard being provided with a foot-plate, $r$, and also extended above said foot-plate in form to be operated by hand, whereby the standard is adapted to serve the twofold purpose of depressing the runners when actuated by the foot and of elevating the runners when actuated by hand.

4. In combination with the wheeled frame, the main frame, the lever I, and its rigid standard M, the dog or pawl N, pivoted to said standard, and the stop $u$, constructed and adjustably secured to the wheeled frame, as described and shown.

5. In combination with the main frame, the runner-frame, the lever I and its rigid standard M, the dog N, and the plate O, provided with a shoulder, $t$, to support the runners in an elevated position, and also with an adjustable shoulder, $u$, to limit the descent of the runners.

6. In combination with the main frame and the runner-frame jointed thereto, the driver's seat and the supporting-standards $n$ therefor, the lower ends of said standards being beveled, as described, to serve as stops to limit the swinging motion of the seat.

7. The coupling for a corn-planter, consisting of the plate $f$, having the arms or trunnions $h$ and the spheroidal protuberance $g$, in combination with the plate $i$, recessed in the rear face to receive said protuberance, and provided with arms $k$, to engage the trunnions.

8. In a coupling for a corn-planter, the head $f$, having the lateral trunnions $h$ and spheroidal protuberance $g$, in combination with the plate $i$, and the vertically-adjustable plate $k$, connected to the plate $i$ by screws $m$ below the trunnions and screws $l$ above the trunnions.

9. In combination with the feed-bar and a driving-gear connected with the ground-wheel, the intermediate crank-lever provided with an elastic arm, whereby the yielding of the parts is permitted.

10. The wheeled frame, the runner-frame jointed thereto, and the reciprocating feed-bar on the runner-frame, in combination with the elbow-lever $l'$, mounted on the wheeled frame and connected by intermediate gearing with one of the wheels, and the vibratory arm $j^2$, engaging at one end with the feed-bar and united at the opposite end by a horizontal pivot to the lever $l'$, as shown.

11. In combination with the rotary dropper-plate having the studs thereon, a reciprocating plate or carrier, T, the stationary studs $b'$ and $e'$, and the horizontal swinging pawls S and R, pivoted to the carrier-plate and extended rearward, as described, to remain in engagement with the stationary studs throughout their entire movement, whereby they are caused to remain positively in engagement with the dropper-plate while acting to turn the same.

12. In combination with the rotary dropper-plate having studs thereon, the reciprocating plate or carrier T, and the horizontally-swinging pawls R and S, pivoted thereto and arranged to co-operate with stationary studs $e'$ and $b'$, said parts being constructed and arranged as described, so that each pawl during its advance encounters two studs on the dropper-plate, one in front and the other in rear of the pivot of the pawl.

13. In combination with a corn-planter, a standard at its rear, a marker hinged at its rear end, and a cord and break-pin connecting the marker and standard, substantially as described.

14. In a seed mechanism, a rotary dropper-plate provided with studs or teeth, combined with a reciprocating pawl, S, mounted on a vertical pivot between its extremities and curved on its outer side, in combination with a stationary stud adapted to act on the two ends of the pawl alternately.

15. In a seed-dropping mechanism, the combination of a rotary dropper-plate, a covering-plate therefor, and vertically-adjustable supports for said plate.

16. In combination with a rotary dropper-plate and the covering-plate therefor, the adjustable supporting-screws $x$, whereby the covering-plate may be raised and lowered at will.

JARVIS CASE.

Witnesses:
W. F. ROSS,
C. MORRIS.